INVENTORS
Jerome B. Wiener
Hans M. Stern
Alfred M. Nelson

Attorneys

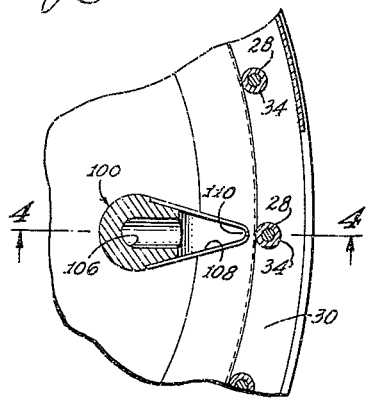
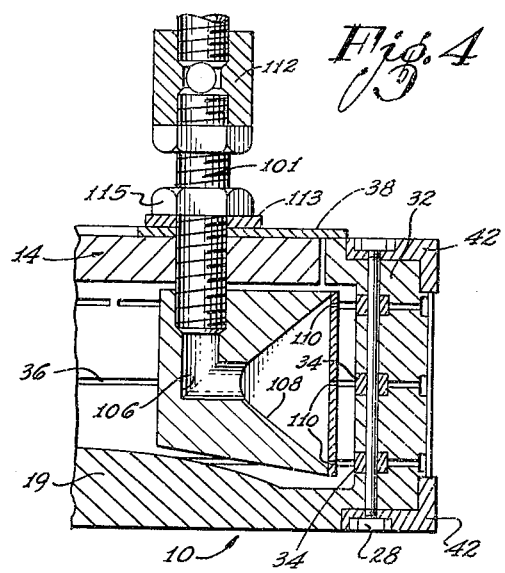
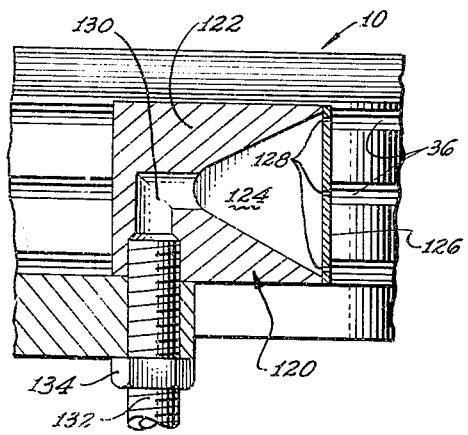
INVENTORS:
Jerome B. Wiener
Hans M. Stern
Alfred M. Nelson

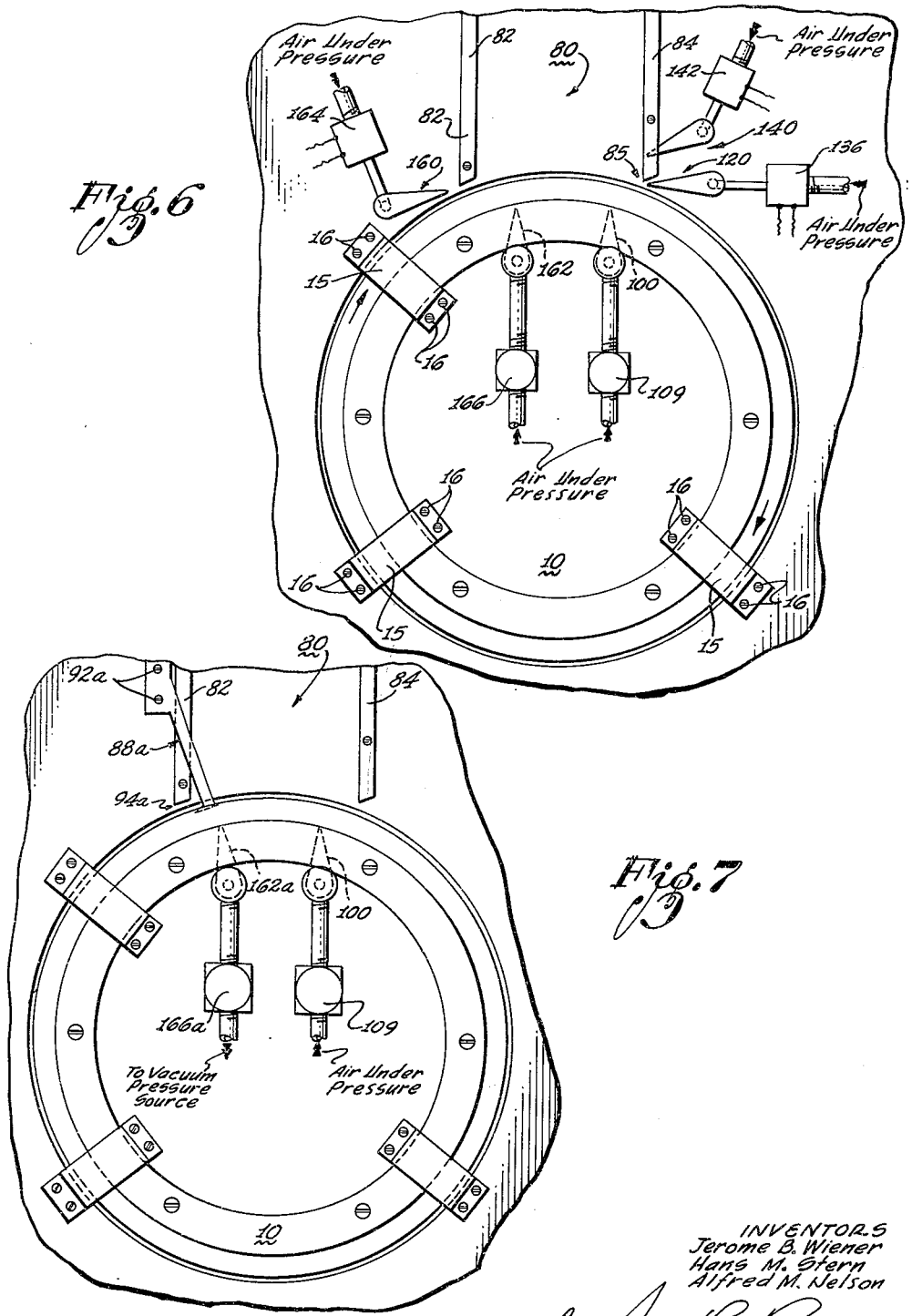

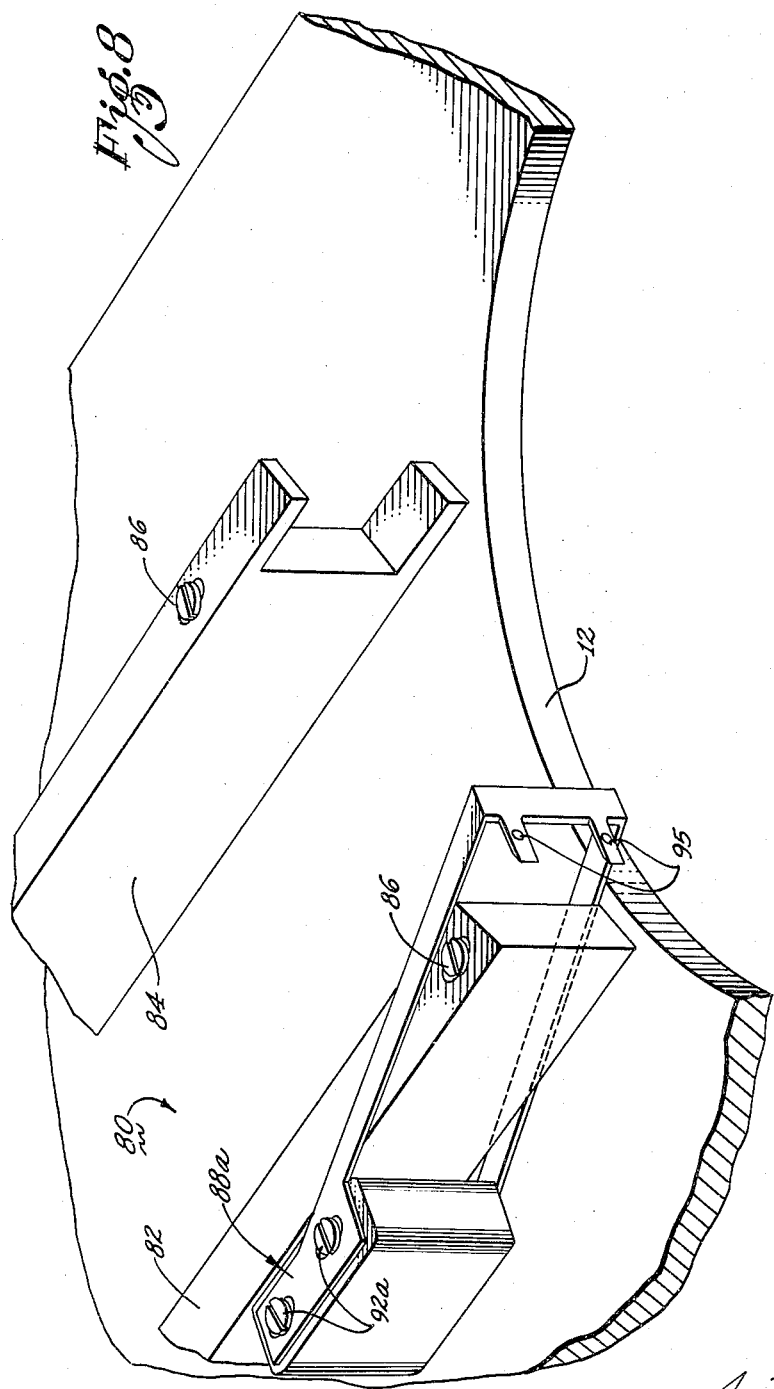

United States Patent Office 2,973,200
Patented Feb. 28, 1961

2,973,200

CARD PROCESSING APPARATUS

Jerome B. Wiener, Granada Hills, Hans M. Stern, Culver City, and Alfred M. Nelson, Torrance, Calif., assignors to Magnavox Company, Los Angeles, Calif., a corporation of Delaware Filed Dec. 23, 1957, Ser. No. 704,788

27 Claims. (Cl. 271—5)

This invention relates to apparatus for processing a plurality of information storage cards. The invention is directed more particularly to card processing apparatus which includes a station for holding the information storage cards, the station being controllable either to feed the cards in succession to a transporting component of the apparatus or to receive cards from the transporting component.

Binary digital coding is usually used in data processing systems to store information and data pertinent to the particular type of business or other organization with which the particular system is used.

In one type of such a system, the data is recorded on a plurality of separate cards. Each of these cards is provided with a series of transverse rows of data, and each such row is said to correspond to a particular "position" of the card. As noted above, binary coding is usually used so that the data at each position of each card represents in binary form a decimal number, or its coded equivalent. The information on the cards may be stored in the form of magnetic areas of one polarity or another, in the form of holes punched in the cards, in the form of photographic information or in any other appropriate way. When magnetic areas are used, one polarity may represent a unity binary digit and the opposite polarity may represent a zero binary digit. Likewise, the binary digits may be represented by the presence or absence of a hole at the proper location on the cards.

Many thousands of information storage cards are used in complex data processing systems. This means that millions of bits of data are required to be recorded on the cards for use in such systems. It is usual in such systems for the information storage cards to be stored in a stacked relationship. When it is desired to process any particular stack of the cards, that stack is placed in an input station so that its cards may be successively fed into the processing apparatus. After the processing of the cards has been completed, they are usually returned to the same or to a different input station.

In many types of prior art card processing apparatus, separate units were used as input stations and output stations. That is, the cards were first placed in an input station to be fed successively into the processing apparatus. However, the input station was incapable of later functioning to receive the cards after they had been processed. Instead, the cards had to be fed to a separate and different instrumentality which was capable as functioning as an output station.

More flexible apparatus is disclosed in copending application Serial No. 538,111, which was filed October 3, 1955, for Robert M. Hayes et al. (now United States Patent No. 2,842,362). The apparatus of that application included card holding stations which were capable of functioning either as input stations or as output stations for the cards.

The Hayes apparatus disclosed and claimed in copending application Serial No. 538,111 permits cards to be fed in succession from a particular station to the transporting component of the system for subsequent processing. This transporting component may be a rotatable drum in which a vacuum effect is produced on the periphery of the drum to hold the cards in fixed position on the drum during the drum rotation. Then, the cards may be automatically returned to the same station after the processing has been completed. This apparatus of the copending application also permits a convenient interchange of the information storage cards between two or more stations for sorting or collating purposes. The over-all effect of the apparatus is to reduce the complexity of data processing systems and to render them more flexible.

The reversible feeding-stacking input-output station of the copending application referred to above utilizes mechanical linkages and members to accomplish its desired dual purpose. Copending application Serial No. 645,639, which was filed March 12, 1957, in the name of Alfred M. Nelson et al., also provides a reversible input-output feeding-stacking card holding station.

The input station of the Nelson application accomplishes the desired purposes of the earlier Hayes application referred to above. However, in the later case the station uses pneumatic or vacuum pressure principles rather than strictly mechanical linkages to retain the cards in the station and to controllably feed them into the apparatus. This, as fully described in the Nelson application, permits certain simplifications to be made in the construction and design of the apparatus.

The present invention similarly provides a reversible input-output station for information storage cards using pneumatic or vacuum pressure principles. The present invention, however, makes extensive use of pneumatic and vacuum pressure principles to control the feeding of cards in and out of the station.

In one embodiment of the invention, one or more pressurized air jets are used to force the leading edge of a selected transported information storage card from the transporting means of the processing system as the card is transported past the mouth of the station into which it is to be deposited. This causes the leading edge of the card to engage the trailing wall of the station, and this, in turn, causes the card to be deposited in the station. The cards may be lifted from the transport means into the station by an air stream directed outwardly through the transport means and against the cards in a direction perpendicular to the face of the cards. This stack action on the cards may be aided by a second jet stream directed against the leading edges of the cards in a direction to shear the cards from the transport means. The jet streams for stacking the cards are located near the trailing wall of the station.

In the embodiment described above, a fixed pawl may be used at the mouth of the station to move the trailing edges of the cards out from the transporting component. As each card is moved against the trailing wall of the station, as described above, the card is arrested at the mouth of the station with its trailing edge held out from the transporting component by the pawl. This assures that each succeeding card will pass under an arrested preceding card to deposit the preceding card in the station while maintaining the cards in the proper sequence. The pawl may have a vacuum air jet associated with it in accordance with a further embodiment of the invention to control the release of cards by the station, as will be described. Alternately, the pawl itself may be dispensed with in accordance with yet another embodiment of the invention, and the functions of the pawl may be performed by a further pressure jet. This latter embodiment will also be described in detail.

Other means for providing a jet stream of air may be disposed near the trailing wall of a station. These means are disposed to produce a force for directing the leading edges of the cards in the station toward the transporting component such as the drum. By producing such a force on the cards, the transporting means are able to grip the cards with a sufficient friction force for removing the cards from the station. The cards are able to move individually and sequentially with the transport means through a narrow throat formed between the trailing wall of the station and the periphery of the drum. The cards are able to move through this throat since the leading edges of the cards are forced by the air stream downwardly toward the throat.

The constructional features of the holding station of the invention described above contribute to produce an efficient and accurate control of the cards. The control permits the feed of cards from the station, or it causes cards to be fed into the station. This efficient control is achieved by a further simplification of parts and by a further reduction in the cost and space requirements of the apparatus, as compared with previous systems and apparatus of this general type.

In the drawings:

Fig. 1 is a top plan view showing in somewhat schematic form a card processing system which incorporates as a pair of its components two card holding stations, each constructed in accordance with one embodiment of the invention, and each of the illustrated stations including a series of controlled air pressure jets which, in turn, control the transfer of cards in and out of the respective stations;

Fig. 3 is a sectional view substantially on the line 3—3 of Fig. 2 and showing in some detail a unit which is mounted internally of the transporting drum of Fig. 2 in a fixed position relative to one of the card holding stations to direct a stream of pressurized air to the mouth of that station for reasons to be described;

Fig. 4 is a sectional view substantially on the line 4—4 of Fig. 3 and showing further details of the unit of Fig. 3 for directing a stream of pressurized air against the mouth of one of the stations of the system of Fig. 1;

Fig. 5 is a sectional view substantially on the line 5—5 of Fig. 1 showing the details of another unit which is used in the system for directing a pressurized air jet at the mouth of one of the card holding stations of the system;

Fig. 6 is a top plan view of a card processing system constructed in accordance with a further embodiment of the invention, this view showing in schematic form a series of mechanisms for controllably directing streams of pressurized fluid at the mouth of a card holding station for purposes to be described;

Fig. 7 is a schematic representation of a still further embodiment of the invention for using pneumatic means to move the trailing edges of the cards away from the transporting means at the mouth of the station for reasons referred to above and for using a mechanical pawl for this purpose and a vacuum pressure mechanism in conjunction with the mechanical pawl to control the feed of cards from the station to the transporting means; and Fig. 8 is a perspective view on an enlarged scale of the station associated with the system of Fig. 7, this view illustrating particularly the mechanical pawl which has a pair of apertured fingers through which the vacuum pressure is exerted for the control functions referred to above.

Figure 1:
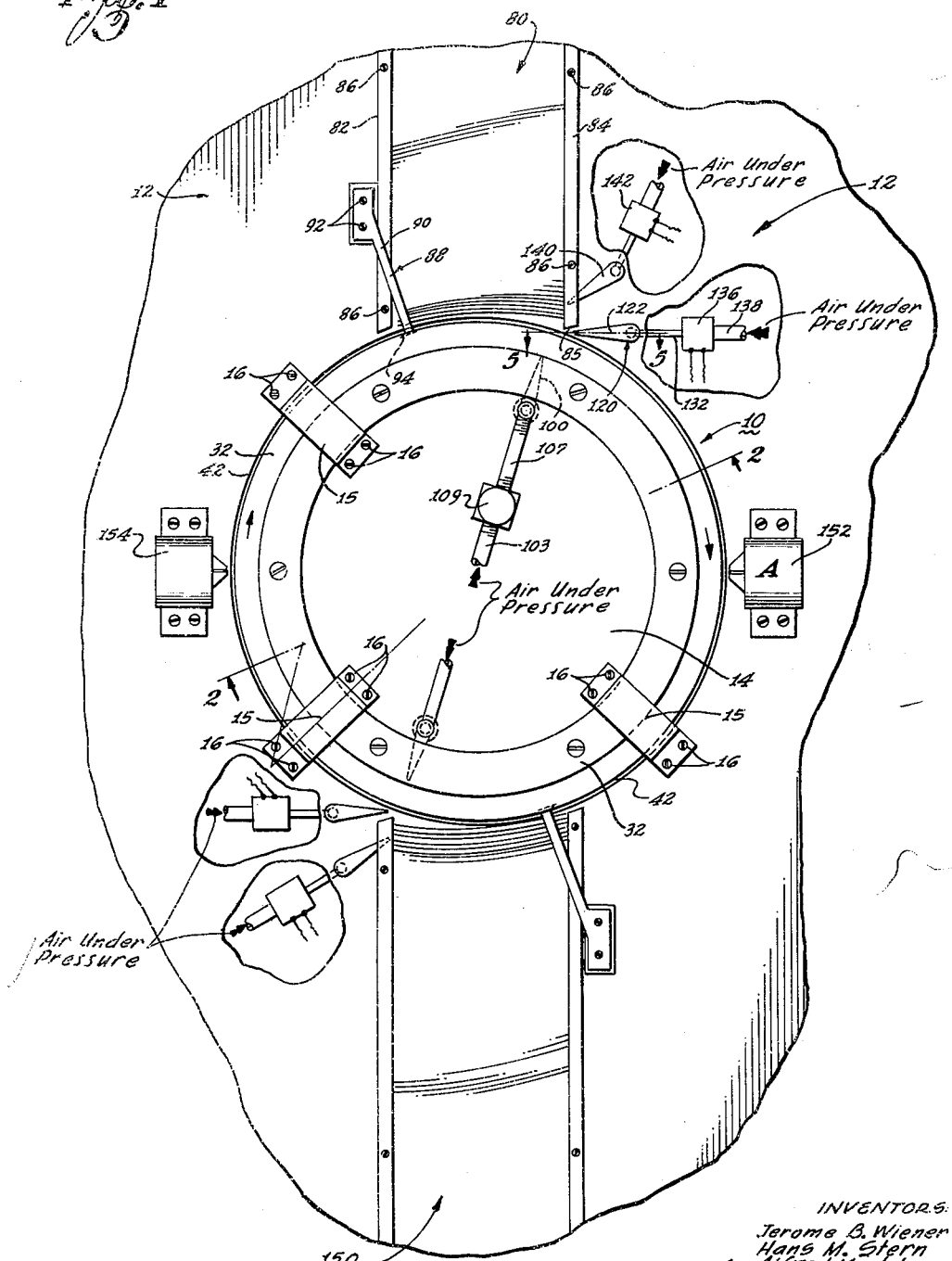

The system of Fig. 1 includes a transporting component 10 which is mounted on a suitable supporting surface such as a table top 12. The transporting component 10 may be in the form of a drum, and it may include an outer annular rotating portion and an inner stationary portion. The drum 10 is shown in detail in Fig. 2. The drum is shown by arrows as rotating in a counterclockwise direction in Fig. 1.

Figure 2:
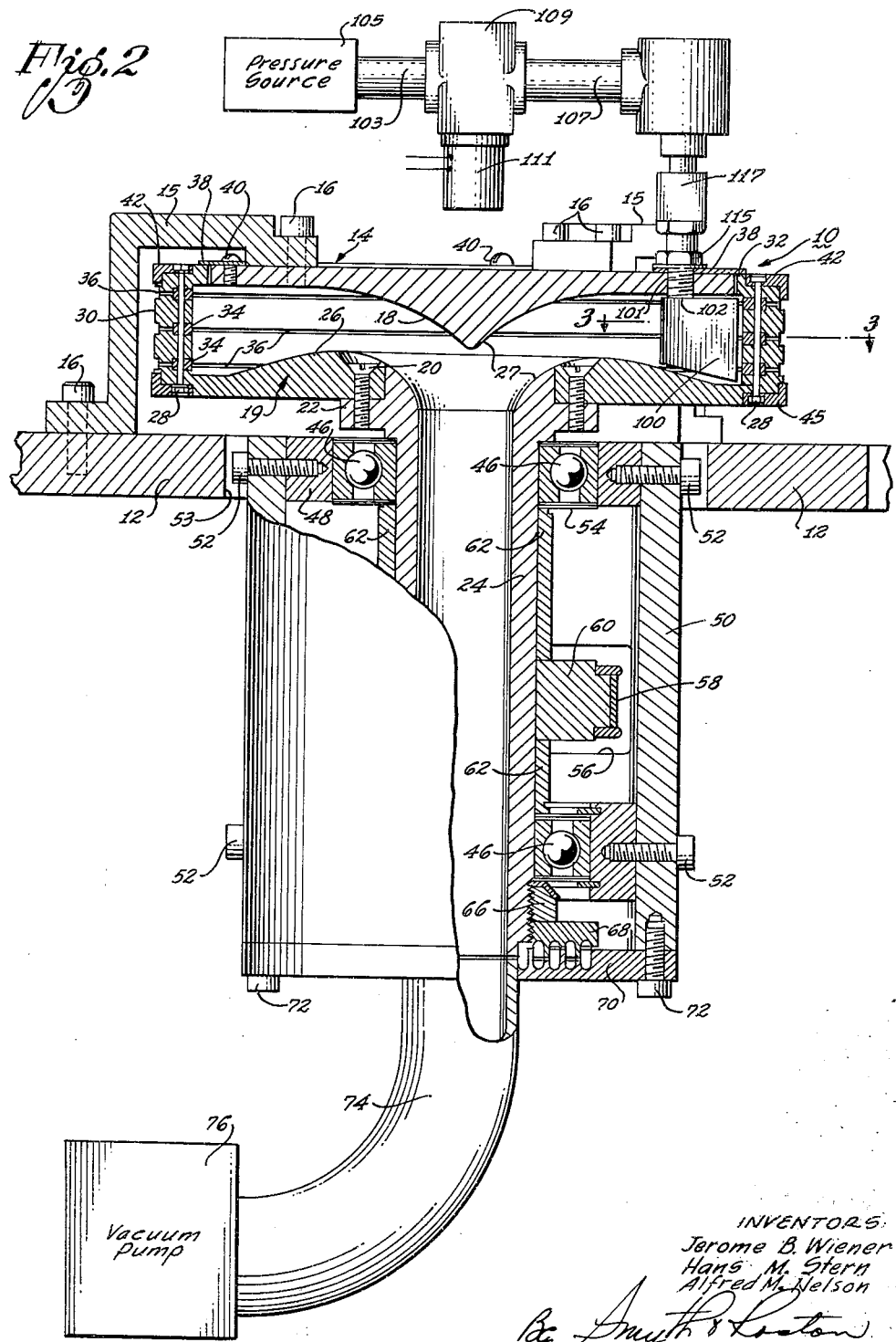
Fig. 2 is a sectional view substantially on the line 2—2 of Fig. 1 and illustrating the constructional details of a transporting component of the system of Fig. 1, this component being in the form of a rotatable vacuum pressure drum which transports cards on its peripheral surface.

The drum 10, as shown in Fig. 2, includes an annular disk-like stationary top plate 14 which is attached to the table top 12 by a plurality of brackets 15 (also shown in Fig. 2) and screws 16. These brackets are disposed at spaced angular positions about the drum. The upper face of the plate 14 is flat. The lower face of the plate 14 extends downwardly as it extends radially inwardly so as to approximate a conical shape. This is illustrated as 18 in Fig. 2.

Certain portions of the transporting component or drum 10 are adapted to rotate with respect to the stationary plate 14. These portions include an annular bottom plate 19 which is attached by a plurality of screws 20 to a collar 22 on a rotatable hollow shaft 24. The lower face of the plate 19 is flat. The upper face of the plate 19 extends upwardly as it extends radially inwardly so as to approximate a conical configuration, like the lower surface of the plate 14. This conical configuration of the upper face of the plate 19 is represented at 26 in Fig. 2. The space between the top plate 14 and the bottom plate 19 may be considered as a passageway 27.

A plurality of studs 28 extend upwardly through the rotatable bottom plate 19 at spaced positions around the periphery of that plate. The studs 28 extend through a pair of rings 30 and through an annular cover plate 32 to maintain the plates 19 and 32 and the rings 30 in a fixed position with respect to one another. Sockets are provided at the inner edges of the rings 30 in the upper and lower faces of the rings and are also provided at the inner edges of the plates 19 and 32. A plurality of spacers 34 are disposed in the sockets in the plates 19 and 32 and in the rings 30 to form a series of axially spaced annular slots 36 between the rings and between the rings and the plates.

The annular cover plate 32 extends to a position contiguous to the stationary disk-like top plate 14 such that the upper surface of the plate 32 is substantially flush with the upper surface of the plate 14. An annular strip 38 is positioned on the plates 14 and 32 between the plates, and this strip is attached by a plurality of screws 40 to the plate 14 effectively to seal the slot which is formed between the plates.

At a peripheral position at its upper end, the annular cover plate 32 has a shoulder portion for receiving an annular cap member 42. The cap member 42 is provided with sockets for receiving nuts which are screwed on threaded portions at the upper end of the studs 28. This functions to fixedly position the cap member 42 with respect to the cover plate 32. The cap member 42 has a lip portion which extends downwardly to a position overhanging the cover plate 32 and the rings 30 by a horizontal distance corresponding substantially to a thickness of the information storage cards to be carried by the transporting component. A cap member 45 is associated with the bottom plate 19 in a manner similar to the association of the cap member 42 with the plate 32. In this manner, the cap members 42 and 45 define a peripheral channel about the drum 10, and the information cards may be supported in that channel.

Bearings 46 are provided at opposite ends of the rotatable hollow shaft 24. The inner races of the bearings 46 are mounted on the shaft 24 and the outer races of the bearings are disposed against bushings 48 secured to a housing 50 by a plurality of studs 52. The housing 50 extends through a hole 53 in the table top 12. Seals 54 are disposed at opposite ends of the bearings to prevent leakage of the lubricating fluid from the bearings. An opening 56 is provided in the housing 50 between the bearings 46. The opening 56 is provided so that a belt 58 can extend into the housing and around a pulley 60 which is keyed to the shaft 24. The pulley 60 is axially positioned on the shaft 24, as by sleeves 62 which are mounted on the shaft between the bearings 46. In this way, the shaft 24 can be rotated by a suitable motor (not shown) coupled to the belt 58.

The bearings 46 and the sleeves 62 are maintained in fixed position on the shaft 24 by a lock washer 64 and a nut 66. The nut 66 is adapted to be screwed on a threaded portion at the bottom of the shaft 24. A sealing disk 58 is also adapted to be screwed on the threaded portion of the shaft 24. The sealing disk 68 operates in conjunction with a bottom plate 70 to prevent movement of air between the interior of the housing 50 and the interior of the hollow shaft 24 when a pressure differential exists between the housing and the shaft.

The plate 70 is secured to the housing 50 by a plurality of studs 72. A hollow conduit 74 is, in turn, disposed as by a push-fit within the plate 70. In this manner, air can be exhausted from the hollow interiors of the shaft 24 and the conduit 74 as by a vacuum pump 76. Although the pump 76 is shown in block form in Fig. 2, it should be appreciated that any suitable type of pump can be used.

The pump 76, therefore, creates a vacuum pressure through the annular slots 36 at the peripheral surface of the transporting drum 10. Rotation of the shaft 24 causes the bottom plate 19 to rotate and, with it, the rings 30 and the annular cover plate 32. The disk-like top plate 14, however, is held stationary by the brackets 15. Therefore, cards held on the periphery of these rings by the vacuum pressure created through the slots 36 are caused to rotate with the drum.

As illustrated in Fig. 1, the system includes a card holding station 80 which is positioned with its mouth contiguous to the peripheral surface of the transporting component described above. The station 80 has a leading wall or guide rail 82 and it has a trailing wall or guide rail 84. These walls are fastened to the table top 12 by a plurality of screws 86. The walls are so fastened in spaced parallel relation, and they are spaced apart a distance corresponding to the length of the information storage cards.

The information storage cards are held in a stacked relation between the walls 82 and 84 with the lower edges of the cards resting on the table top 12. A suitable pusher member (not shown) is usually included in the station, and this member is resiliently biased towards the mouth of the station to urge the stack of cards against the peripheral surface of the transporting drum 10.

The leading end of the trailing wall 84 defines a throat 85 with the peripheral surface of the transporting drum 10. This throat is formed by spacing the leading edge of the wall from the peripheral surface by a distance corresponding essentially to just over the thickness of a single card. This throat, therefore, permits one card at a time only to be released from the station 80.

The leading wall 82, on the other hand, may have a mechanical pawl assembly 88 associated with it. This pawl assembly has an inclined bracket portion 90 which extends across the wall 82. The assembly is mounted on a supporting base adjacent the wall 82 by means of a pair of screws 92, and this base is secured to the table top 12. The pawl assembly 88 has a pair of bulged fingers 94 which extend into corresponding annular grooves formed in the peripheral surface of the transporting drum 10 adjacent the slots 36. The fingers 94 may be constructed in a manner similar to that disclosed in co-pending application Serial No. 645,639 filed March 12, 1957, by Eric Azari et al., or in any other suitable manner.

The fingers 94 of the pawl assembly are positioned adjacent the leading wall 82, and the central portion of these fingers is bulged outwardly from the periphery of the transporting drum 10. The arrangement is such that any card arrested by the trailing wall 84 of the station has its trailing edge extending over the fingers 94 and displaced outwardly from the periphery of the transporting component 10. This allows the next card transported by the transporting component to move up over the fingers 94 and under the preceding card. The second card, therefore, is able to deposit the preceding card into the station 80.

A pneumatic member 100 is disposed within the transporting drum 10 between the stationary top plate 14 and the rotatable bottom plate 19 at a position contiguous to the periphery of the transporting component. The member 100 is supported on the stationary top plate, and it is positioned so that streams of pressurized fluid may be directed to a point on the periphery of the transporting component adjacent the throat 85.

The member 100 is provided at its upper surface with a tapped hole so that it can be screwed to a threaded end portion of a feed line 101. A gasket 102 (Fig. 2) is positioned coaxial with the feed line 101 between the top of the member 100 and the lower surface of the stationary top plate 14. This gasket serves to separate the member 100 and the top plate 14.

The apparatus includes a supply line 103, best seen in Fig. 2, adapted to receive a flow of fluid such as air under pressure from a pressure source 105. Although the pressure source 105 is indicated in block form for purposes of simplification, it should be appreciated that various types of pressure sources can be used. The supply line 103 is adapted to be coupled to a supply line 107 through the control of a solenoid-actuated valve 109. The operation of the valve 109 is, in turn, controlled by a solenoid 111. The construction of the valve 109 and the solenoid 111 is shown somewhat schematically in Fig. 2 since it is believed that the construction of these members is well understood by those skilled in the art.

The supply line 107, in turn, communicates with a coupler 112 (Fig. 4) disposed above the transporting component 10, and the feed line 101 extends downwardly from the coupler 113. The feed line 101 extends down through a hole in the sealing strip 38 and in the stationary top plate 14, and as noted, its threaded end portion is screwed into a tapped hole in the top of the member 100. A gasket 113 may be disposed on the feed line 101 and positioned against the sealing strip 38. A lock nut 115 is screwed on the threaded portion of the feed line 101 to press against the gasket 113 and maintain the feed line and the member 100 in a fixed position with respect to the stationary top plate 14.

The member 100 may be provided with a teardrop configuration in horizontal cross section, as best shown in Fig. 3. Because of this teardrop configuration, the housing is symmetrical about a center line and it tapers towards this line of symmetry progressive towards the periphery of the transporting drum 10.

A passageway 106 (Figs. 3 and 4) is provided in the housing 100 in communication with the feed line 101. The passageway 106 has a first portion which extends downwardly from the feed line 101, and it has a second portion which extends horizontally toward the periphery of the transporting drum 10. The horizontal portion of the passageway 106, in turn, communicates with a mouth portion 108 in the member (Figs. 3 and 4).

The mouth portion 108 in the member 100 occupies almost the entire vertical dimension of the member. The mouth portion 108, however, has a tapered configuration in the horizontal direction toward the periphery of the transporting drum 10, and it communicates with a series of holes 110 provided in the member 100 at its end closest to the periphery of the drum. The holes 110 are disposed in the vertical direction at spaced positions corresponding to the vertical levels of the slots 36 in the drum 10. This may best be seen in Fig. 4.

Air or other appropriate fluid under pressure is introduced to the feed line 103 from the pressure source 105 (Fig. 2). When the solenoid 103 is activated, the valve 109 opens and permits the stream of pressurized air to flow into the member 100 through the feed line 107 and coupler 113, and down through the feed line 101 and the passageway 106 (Fig. 4). The pressurized air from the mouth portion 108 of the member 100 passes through the holes 110 as high velocity jets. These air jets overcome the vacuum pressure exerted by the transporting component in the vicinity of the mouth formed by the trailing wall 84 of the station 80 and the periphery of the transporting component.

Therefore, should a card be transported on the periphery of the transporting drum 10 to the mouth of the station 80, and should the solenoid valve 109 be actuated, the resulting streams of air from the pneumatic member 100 would cause the leading edge of that card to be moved outwardly from the periphery of the drum to engage the trailing wall 84 of the station. This would cause the card to be arrested across the mouth of the station 80 with its trailing edge extending over the fingers 94 of the pawl assembly 88.

Then, should the solenoid valve 109 remain actuated, the next succeeding card transported on the transporting drum 10 would pass over the fingers 94 and under the preceding card. The second card also would have its leading edge forced away from the periphery of the drum by the air streams from the member 100. The second card also, therefore, engages the trailing wall 84. In this manner, so long as the solenoid valve 109 remains open, under the control of the solenoid 111, cards transported on the transporting drum 10 become successively deposited in the station 80.

The described action of the air streams from the member 100 may be assisted by a pneumatic lifter member 120 (Fig. 1). This latter lifter may be similar in its construction to the member 100. Actually, the lifter assembly may also be used without the member 100 to obtain a transfer of cards from the drum 10 to the station 80. Such a member is disclosed in detail and claimed in copending application Serial No. 562,154, filed January 30, 1956, by Stuart L. Peck et al.

The lifter 120 is shown in section in Fig. 5. The lifter includes a housing portion 122 having a tapered configuration as viewed in plan and as shown in Fig. 1. The housing 122 encloses a bell-shaped chamber 124, and this chamber extends to the tapered end of the housing. A plate 126 encloses the tapered end of the housing, and this plate has a plurality of holes 128 extending through it. The holes 128 are aligned with respective ones of the annular slots 36 in the transporting drum 10.

The housing 122 also encloses a passageway 130. The passageway has a horizontal portion which communicates with the chamber 124, and it also has a vertical portion. A feed line 132 extends upwardly through the table top 12 and into the vertical portion of the passageway 130. The end of the feed line 132 is threaded so that it may threadedly engage a tapped hole in the housing. Also, a nut 134 is threaded to the feed line to engage the underside of the table top and thereby hold the lifter 120 rigidly in position.

A solenoid valve 136 (Fig. 1) is interposed between the feed line 132 and a further feed line 138. The latter feed line is connected to a suitable source of pressurized fluid such as air. The lifter 120 is positioned to direct streams of pressurized fluid through the holes 128 when the solenoid valve 136 is actuated. The lifter 120 is positioned so that the emitted streams of air pass essentially tangential to the transporting drum 10 through the throat 85 of the station 80 formed between the trailing wall 84 and the drum. The lifter 120, however, is displaced radially from the periphery of the transporting drum 10 a distance sufficient to permit cards transported on the drum to pass freely between the lifter and the drum. The air under pressure enters through the feed line 132 and through the passageway 130 to the chamber 124. Then, it emerges as streams of air from the holes 128 in the plate 126.

When the solenoid valve 109 and 136 are not activated, any cards transported on the transporting drum 10 are transported over the pawl assembly 88 and past the mouth of the station 80. These cards, because of the vacuum pressure exerted on them at the peripheral surface of the transporting drum, pass in succession through the throat 85. However, should one or both of the solenoid valves 109 and 136 be activated, the resulting streams of pressurized air issuing from the pneumatic members 100 and 122 counteract the vacuum pressure exerted at the peripheral surface of the transporting drum 10. This, as explained above, causes the leading edge of each card transported to the mouth of the station 80 to be moved away from the perihpery of the transporting drum to engage the wall 84. This causes such cards to be arrested and to be deposited in sequence in the station 80, as discussed previously. Under some circumstances, either the member 100 or the member 120 is sufficient to achieve this purpose. However, it is sometimes desirable to activate both the members to assure the proper stacking of cards into the station 80.

A further pneumatic member 140, similar to the members 100 and 120, may also be positioned on the table top 12. This latter member has its tapered end extending through the trailing wall 84 of the station 80. The pneumatic member 140 may be similar in its construction to the lifter 120, as noted above, and it may be mounted in a similar manner on the table top. The flow of pressurized fluid to the member 140 is controlled by a solenoid valve 142. As illustrated in Fig. 1, the member 140 is inclined so as to direct streams of air toward the leading edges of the forward cards stacked in the station 80. These streams of air are directed in a direction to bias these leading edges toward and against the periphery of the transporting drum 10.

The pneumatic member 140 may be used for feeding cards in a controllable manner from the station 80 to the periphery of the transporting drum 10. For this latter operation, the lifter 120 may be fully de-activated and the pneumatic member 100 may be de-activated or reduced somewhat in pressure, preferably on an intermittent basis in synchronism with the bursts from the member 140. That is, the air pressure emerging from the member 100 can be made such that in the absence of streams of air from the member 140 the cards are maintained in the station 80. Now, each time the solenoid valve 142 is energized to cause the member 140 to emit a burst of pressurized air, the leading edges of the cards in the station 80 are moved against the periphery of the transporting drum 10 against the lesser action of the pressurized air streams from the member 100. This enables the leading card in the station 80 to pass through the throat 85 and to thereby be released to the transporting drum.

The energizing of the solenoid valve 142 may be controlled and properly timed so that one card may be released each time the valve is activated. Alternately, a continuous activation of the valve causes the cards in the station 80 to be released in a one-by-one sequence through the throat 85 to the periphery of the transporting component 10.

As shown in Fig. 1, a second station 150 may also be mounted on the table top 12 and positioned to have its mouth adjacent the periphery of the transporting drum 10. The station 150 may, for example, be diametrically opposite the station 80. As illustrated, the station 150 is also equipped with a series of lifters and blowers which may be controlled in the same manner as those described above. The station 150 also includes a pawl assembly which performs the same functions as the pawl assembly 88 associated with the station 80.

A first transducer means 152 is mounted on the table top 12 and positioned adjacent the periphery of the transporting drum 10 between the stations 80 and 150. A second transducer means 154 may be similarly mounted and positioned on the opposite side of the drum from the transducer means 152. Both of these transducer means may comprise a series of electromagnetic transducer heads which are spaced from the periphery of the transporting drum 10 by an amount sufficient to permit each card to be transported by the drum past the heads for processing purposes.

The station 80 may be controlled to a feeding mode, in the manner described, by the de-actviation of the pneumatic member 122 and by the reduction in air pressure of the streams of air from the member 100. Then, the solenoid valve 142 may be intermittently or continuously energized to release cards from the station to the drum. The released cards pass in succession past the transducer means 152 at which they are processed.

The station 150 may be conditioned to a stacking mode in a manner similar to that described in conjunction with the station 80 and by activating its pneumatic members corresponding to the members 100 and 122 associated with the station 80. This causes the processed cards from the transducer means 152 to be deposited in the station 150 in a manner similar to that described.

Subsequently, the station 150 may be conditioned to a feeding mode and the station 80 conditioned to a stacking mode. Then, the cards are released in sequence from the station 150 to the drum 10 to be processed by the transducer means 154. The processed cards are then deposited in the station 80.

Alternately, it is possible to release a card from the station 80 in the described manner and cause that card to be processed by the transducer means 152, for example. Then, by the de-activation of the pneumatic members associated with the station 150, the card may be made to pass under the station 150 to be returned to the station 80. Should there be cards in the station 150, this latter pass-under operation is accomplished by a stacking operation followed by an immediate feeding operation. That is, to maintain the cards in the station 150, its pneumatic member equivalent to the member 100 is continuously activated. This causes the transported cards from the station 80 to become stacked in the station 150. However, a controlled pulsing of the solenoid valve at the station equivalent to the valve 142 causes that card to be immediately released. Therefore, any card in effect can be made to pass under a loaded station by the simple expedient of stacking the card in the station and immediately releasing that card.

The embodiment of the invention shown in Fig. 6 is similar in some respects to the embodiment of Fig. 1 and like elements have been represented by the same numbers. In the latter embodiment, only the station 80 and its associated elements have been illustrated. Of course, other stations and appropriate transducer means may also be incorporated into the apparatus in the manner such as that explained in conjunction with Fig. 1.

The station 80 in Fig. 6 includes, for example, the three pneumatic members at the trailing wall 84 of the station as described in the apparatus of Fig. 1, these members performing their described function for stacking and feeding cards to and from the station.

In the latter embodiment, however, the pawl assembly 88 of Fig. 1 has been dispensed with and has been replaced by a pair of pneumatic members 160 and 162. The member 160 is mounted in a manner similar to the member 120 (as described in conjunction with Fig. 5) and it may have the same constructional details. A solenoid valve 164 is incorporated in the feed line to the member 160 to control the introduction of the pressurized fluid to that lifter. The member 160 is positioned adjacent the periphery of the transporting component 10, and it has its tapered end directed to the space between the leading wall 82 of the station 80 and the periphery of the drum 10.

The pneumatic member 160 is spaced from the drum 10 by a distance sufficient to allow cards carried on the periphery of the drum to pass freely between it and the drum. When activated, the pneumatic member 160 emits streams of pressurized fluid such as air, and these streams cause the trailing edges of the transported cards to be moved out away from the periphery of the transporting drum 10. This duplicates exactly the function of the pawl assembly 88 in the embodiment of Fig. 1.

The action of the pneumatic member 160 may be assisted by the pneumatic member 162. The member 162 may be similar to the assembly of the pneumatic member 100, and it may be mounted in the stationary portion of the transporting drum 10 in the same manner. A solenoid valve 166 is included in the feed line to the member 162 to control the introduction of pressurized fluid, such as air, to the member. The apertured tapered end of the member 162 is directed at a point on the periphery of the component 10 lying just ahead of the leading wall 82 of the station 80. This was the point previously occupied by the fingers 94 of the pawl assembly 88.

It is evident that, when one or both of the pneumatic members 160 and 162 are activated, the trailing edge of each card arrested by the wall 84 is moved out from the periphery of the transporting drum 10. This permits a succeeding card to move up and under the trailing edge of the arrested card. This causes each card to be deposited in the station 80 in the same manner in which the pawl assembly 88 achieved that result in the previous embodiment.

The pressure of the air streams from the pneumatic member 162 is preferably just sufficient to counteract the vacuum pressure exerted by the transporting component at its peripheral surface. This is so that the leading edges of the cards coming under the influence of the lifter 162 will not have a tendency to be moved away from the periphery of the transporting component but will move under the dsiplaced trailing edge of the preceding card. Then, when the latter card reaches its arrested position, its trailing edge is able to come under the influence of the lifter 160 to be raised up from the transporting drum for the described purposes.

The embodiment of the invention shown in Figs. 7 and 8 includes a pawl assembly 88a which is similar to the assembly 88 of Fig. 1. However, each of the fingers 94a of the assembly has an aperture 95 (Fig. 8) formed in it. Also, the assembly includes a pneumatic member 162a which is similar to the member 162 of the embodiment of Fig. 6. However, the feed line of the member 162a is coupled to a vacuum pressure source, and a solenoid valve 166a controls the introduction of vacuum pressure to the member.

When the solenoid valve 166a is activated, the member 162a establishes a vacuum pressure at the periphery of the transporting drum 10 in the immediate vicinity of the holes 95 in the fingers 94a of the pawl assembly 88a. This vacuum pressure is made greater than the vacuum pressure exerted at the peripheral surface of the transporting drum. Therefore, any card extending over the fingers 94a may be held on the pawl assembly against the action of the transporting component 10 by the activation of the member 162a. It should be appreciated that the fingers 94a can also be directly provided with a vacuum pressure to hold the cards against any removal from the card holder by the transport drum. This is disclosed in copending application Serial No. 689,347 filed October 10, 1957, by Eric Azari et al. (now United States Patent No. 2,905,466).

The apparatus of Fig. 7 also includes the pneumatic member 100 which performs its function described previously. To feed cards from the station 80 to the peripheral surface of the transporting component 10, the pneumatic member 100 is de-activated. The vacuum pressure at the periphery of the drum 10 then draws the leading card in the station 80 downwardly on the periphery of this drum and causes the drum to tend to remove that card. However, the member 162a is activated to exert a greater vacuum force on the card through the holes 95 in the fingers 94a. This latter vacuum pressure is made sufficient to counteract the tendency of the drum 10 to remove the leading card. Then, whenever it is desired to release a card, the solenoid valve 166a is momentarily de-activated so that the vacuum pressure exerted by the member 162a is interrupted. This interruption may be made so brief that one card only is released from the station 80 for each de-activation of the valve 166a. Alternately, the continued de-activation of the valve would allow cards to pass in a one-by-one sequence out of the station 80 in the described manner.

To stack cards in the station 80 of the embodiment of Fig. 7, the member 162a is de-activated, and the solenoid valve 109 is energized to activate the member 100. The resulting streams of pressurized fluid from the member 100 may be given a pressure sufficient merely to counteract the vacuum pressure exerted at the periphery of the drum 10 at a point adjacent the trailing wall 84 of the station. Alternately, the pressure of these streams from the member 10 may be made slightly greater than the vacuum pressure at the periphery of the drum.

Now, and in the described manner, as each card is transported by the drum to the mouth of the station 80, the leading edge of such card is moved away from the periphery of the component to engage the trailing wall 84 of the station. Then, the next succeeding card passes up over the fingers 94a and under the preceding card to be arrested in like manner and to deposit the preceding card into the station. Should it be desired that the second card be passed under the station 80, the previously described stack-and-release technique can be used. That is, the solenoid valve 109 may be controlled to de-activate the member 100 and cut off the streams of air pressure from it to release the latter card imemdiately after it has been arrested.

The present invention provides, therefore, improved and simplified card processing apparatus which includes stations for holding the cards. These stations may be conveniently controlled to feed cards in succession to the transporting component of the apparatus or to receive cards from the transporting component. Also, the stations of the invention have the feature in that they may be controlled to enable cards to be transported by the transporting component effectively under the mouths of the stations even when the stations are loaded with other cards.

The entire control of the various stations of the invention is achieved by pneumatic means and without the need for mechanically moving parts. This not only simplifies the construction of the apparatus as compared with the prior art structures, but enables the apparatus to be controlled at an extremely high rate of speed.

Moreover, the lack of mechanically moving parts in the apparatus of the invention reduces the tendency for the transported cards to become jammed and damaged as they are being controllably fed in and out of the holding stations.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing data on a plurality of information storage cards as represented by signal indications on the cards, the combination of: transport means for providing a movement of the cards; a first card holder disposed in coupled relationship to the transport means and including leading and trailing walls disposed in spaced relationship to hold cards in stacked relationship; a second card holder disposed in coupled relationship to the transport means and including leading and trailing walls disposed in spaced relationship to hold cards in stacked relationship; means including first pneumatic means coupled to the cards in the first card holder for directing a first fluid force toward the trailing wall of the first card holder to provide a controlled transfer of cards to the transport means from the first card holder; means including second pneumatic means coupled to the cards on the transport means for directing a second fluid force toward the trailing wall of the second card holder to provide a controlled transfer of cards from the transport means into the second card holder; and means coupled to the first and second pneumatic means for obtaining the passage of fluid through the first and second pneumatic means to produce the first and second fluid forces.

2. In a system for processing data on a plurality of information storage cards as represented by signal indications on the cards, the combination of: a first card holder having leading and trailing walls separated from each other to retain cards in stacked relationship; a second card holder having leading and trailing walls separated from each other to retain cards in stacked relationship; transport means disposed in coupled relationship to the cards in the first and second card holders for obtaining a removal of cards from the first card holder and for providing a movement of the cards to the second card holder; first means operatively coupled to the cards in the first card holder for directing controlled streams of fluid under pressure toward the leading ends of the cards in the first card holder to obtain a controlled transfer of cards from the first card holder to the transport means; second means operatively coupled to the cards on the transport means for directing controlled streams of fluid under pressure toward the leading ends of the cards being transported by the transport means to obtain a transfer of cards from the transport means into the second card holder; means coupled to the first and second directing means for obtaining a passage of fluid under pressure through the directing means; and means coupled to the cards on the transport means for operating upon the trailing ends of the cards being transferred into the second card holder to obtain a sequential stacking of the cards in the holder in an order related to the movement of the cards by the transport means.

3. In a system for processing data on a plurality of information storage cards as represented by signal indications on the cards, the combination of: a transporting component rotatably mounted and exhibiting a vacuum pressure at its peripheral surface for transporting the information storage cards on such surface; a card holder for maintaining the information storage cards in a stacked relationship, said card holder having a first wall at a leading position in the direction of movement of the cards and having a second wall at a trailing position in the direction of movement of the cards and being positioned to have a mouth adjacent the peripheral surface of said transporting component; means operatively coupled to the cards on the transporting component for directing fluid under pressure in a direction transverse to the face of the cards to overcome the vacuum pressure of said transporting component at the peripheral surface thereof in the vicinity of said second wall for a movement of the leading edge of any card transported by said component into such vicinity outwardly from said surface to engage said second wall; and means coupled to the directing means for introducing the fluid under pressure to the directing means.

4. In a system for processing data on a plurality of information storage cards as represented by signal indications on the cards, the combination of: a rotatably mounted transporting component for the cards for transporting the cards on the peripheral surface thereof; a card holder for maintaining the cards in a stacked relationship, said card holder having a first wall and a second wall extending outwardly from said peripheral surface of said transporting component; means operatively coupled to the cards on the peripheral surface of the transporting component for arresting the cards transported on said peripheral surface of said transporting component with the leading edge of any such arrested card in contiguous relationship with said second wall; stationary means mounted externally of said transporting component for emitting pressurized fluid in the vicinity of said first wall and in a direction having a tangential component with respect to said peripheral surface of said transporting component to cause the trailing edge of such arrested card to be displaced outwardly from said peripheral surface of said transporting component; and means coupled to the fluid-emitting means for introducing the pressurized fluid to such means.

5. In a system for processing data on a plurality of information storage cards as represented by signal indications on the cards, the combination of: a rotatably mounted transporting drum for transporting the cards on the peripheral surface thereof; a card holder for maintaining the cards in a stacked relationship, said card holder having a first wall and a second wall extending outwardly from said peripheral surface of said transporting drum; means operatively coupled to the cards on the peripheral surface of the drum for arresting the cards transported on said peripheral surface of said drum with the leading edge of any such arrested card in contiguous relationship with said second wall; stationary means mounted internally of said transporting drum for emitting pressurized fluid in a direction having a radial component with respect to said drum and in the vicinity of said first wall to cause the trailing edge of such arrested card to be displaced outwardly from said peripheral surface of said transporting drum; and means coupled to the fluid-emitting means for introducing the pressurized fluid to such means.

6. In a system for processing data on a plurality of information storage cards as represented by signal indications on the cards, the combination of: a rotatably mounted transporting drum for the cards and exhibiting a vacuum pressure at its peripheral surface for transporting the cards on such surface; a card holder for maintaining the cards in a stacked relationship, said card holder having a first wall and a second wall extending outwardly from the peripheral surface of said transporting drum, the ends of said walls being spaced from said peripheral surface of said drum by distances greater than the thickness of each of the cards; first means operative upon the transported cards for introducing pressurized fluid at the peripheral surface of said transporting drum in the vicinity of said second wall to cause the leading edge of any card transported by said drum into that vicinity to move outwardly and engage such second wall so as to arrest the motion of such card; stationary means mounted externally of said transporting drum for emitting pressurized fluid in a direction having a tangential component with respect to the peripheral surface thereof and in the vicinity of said first wall to cause the trailing edge of the arrested card to extend out from the peripheral surface of said transporting drum; and means coupled to the first fluid-emitting means and to the stationary fluid-emitting means for introducing the pressurized fluid to such means.

7. In a system for processing data on a plurality of information storage cards as represented by signal indications on the cards, the combination of: a rotatable transporting drum for the cards and exhibiting a vacuum pressure at its peripheral surface for transporting the cards on such surface; a card holder for maintaining the cards in a stacked-relationship, said card holder having a first wall and a second wall extending outwardly from the peripheral surface of said transporting drum, the ends of such walls being spaced from said peripheral surface by distances greater than the thickness of each of the cards; first means operative upon the transported cards for introducing pressurized fluid at the peripheral surface of said transporting drum in the vicinity of said second wall to cause the leading edge of any card transported by said drum into that vicinity to move outwardly and engage such second wall so as to arrest the motion of such card; stationary means mounted internally of said rotatable transporting drum for emitting pressurized fluid in a direction having a radial component with respect to such drum and in the vicinity of said first wall to cause the trailing edge of the arrested card to extend out from the peripheral surface of said transporting drum; and means coupled to the first fluid-emitting means and to the stationary fluid-emitting means for introducing the pressurized fluid to such means.

8. In a system for processing data on a plurality of information storage cards as represented by signal indications on the cards, the combination of: transport means for providing a movement of cards; a card holder disposed in contiguous relationship to the transport means and including a pair of spaced walls for retaining cards in stacked relationship; means disposed in coupled relationship to the transport means and the card holder for providing a transfer of cards from the transport means to the card holder; pneumatic means disposed in coupled relationship to the cards on the transport means between the spaced walls of the card holder and in removed relationship to the cards on the transport means and in the card holder for operating upon the cards transported by the transport means to obtain a transfer of cards to the card holder in a sequential order related to the movement of the cards by the transport means; and means coupled to the pneumatic means for introducing air under pressure to the pneumatic means.

9. In a system for processing data on a plurality of information storage cards as represented by signal indications on the cards, the combination of: transport means for providing a movement of cards; a card holder disposed in coupled relationship to the transport means for receiving cards from the transport means and having a leading wall and a trailing wall disposed in spaced relationship for retaining the cards in stacked relationship; means disposed toward the trailing wall of the card holder for exerting a force against the cards being transported by the transport means to obtain a transfer of the cards from the transport means into the card holder; means disposed toward the leading wall of the card holder and in spaced relationship to the cards on the transport means and in the card holder for exerting a pneumatic force against the trailing portion of the cards being transferred from the transport means into the card holder to facilitate the sequential stacking of the cards in the card holder in the order of the transport of the cards by the transport means; and means coupled to the pneumatic means for introducing air under pressure to the pneumatic means to produce the pneumatic force against the trailing portions of the cards.

10. In a system for processing data on a plurality of information storage cards as represented by signal indications on the cards, the combination of: transport means for the cards; a card holder disposed in coupled relationship to the transport means for receiving cards from the transport means and having a leading wall and a trailing wall disposed in spaced relationship for retaining cards in stacked relationship; means disposed at a position near the trailing wall of the card holder for exerting a force against the cards being transported by the transport means to obtain a controlled transfer of the cards from the transport means into the card holder; and means disposed at a position near the leading wall of the card holder for directing fluid under pressure against the trailing portions of the cards being transferred from the transport means into the card holder to facilitate the sequential stacking of the cards in the card holder in an order related to the transport of the cards by the transport means.

11. Apparatus as set forth in claim 10, in which the means for obtaining a transfer of cards from the transport means to the card holder is disposed and constructed to direct a stream of fluid in a direction having a major component perpendicular to the face of the cards.

12. Apparatus as set forth in claim 10, in which the means for obtaining a transfer of cards from the transport means to the card holder is disposed and constructed to direct a stream of fluid in a direction having a major component tangential to the faces of the cards during the transport of the cards by the transport means for the imposition of a shearing force on the cards to remove the cards from the transport means.

13. In a system for processing data on a plurality of information storage cards as represented by signal indications on the cards, the combination of: transport means for providing a movement of the cards; a card holder disposed in contiguous relationship to the transport means for holding cards in the plurality in stacked relationship and including leading and trailing walls disposed in spaced relationship for retaining the cards in stacked relationship; first means disposed toward the trailing wall of the card holder for directing a stream of fluid under pressure against the leading portions of the cards being transported by the transport means to obtain a controlled transfer of cards from the transport means to the card holder; second means disposed in coupled relationship with the cards on the transport means at a position toward the trailing portion of the transport means for directing a stream of fluid under pressure against the trailing portion of each card to obtain an operation upon each card by the leading portion of the next card being transferred into the card holder to facilitate the transfer of cards into the card holder in a sequential order related to the transport of cards by the transport means; and means coupled to the first and second fluid-directing means for introducing fluid under pressure to such means.

14. Apparatus as set forth in claim 13, in which the second means is disposed and constructed to direct streams of fluid under pressure against the trailing portions of the cards in a direction having a major component perpendicular to the faces of the cards to facilitate the sequential stacking of the cards.

15. Apparatus as set forth in claim 13, in which the second means is disposed and constructed to direct streams of fluid under pressure against the trailing portions of the cards in a direction having a major component tangential to the faces of the cards to facilitate the stacking of the cards.

16. In a system for processing data on a plurality of information storage cards as represented by signal indications on the cards, the combination of: means including a card holder having leading and trailing walls for retaining the cards in stacked relationship; transport means for providing a movement of the cards and disposed in coupled relationship to the cards in the card holder for obtaining a transfer of the cards from the card holder to the transport means and forming a restricted opening with the trailing wall of the card holder to obtain a controlled transfer of cards from the card holder; means operatively coupled to the cards in the card holder for operating upon the trailing portions of the cards in the card holder to position such cards for facilitating the transfer of cards to the transport means; pneumatic means operatively coupled to the cards in the card holder for producing a force on the leading ends of the cards in the card holder to direct the leading ends toward the restricted opening for facilitating the transfer of cards from the card holder to the transport means; and means coupled to the pneumatic means for introducing air under pressure to the pneumatic means.

17. Apparatus as set forth in claim 16, in which the means for operating on the trailing portion of the cards includes at least one pawl disposed in coupled relationship to the transport means for positioning the trailing portion of the cards in a particular plane corresponding to the plane of initial movement of the cards by the transport means.

18. In a system for processing data on a plurality of information storage cards as represented by signal indications on the cards, the combination of: transport means for providing a movement of cards; a card holder for retaining the cards and including leading and trailing walls disposed in spaced relationship to maintain the cards in stacked relationship and having the trailing wall extend to a position near the transport means to define a restricted opening with the transport means, the card holder being disposed in coupled relationship to the transport means for the exertion of a force by the transport means against the cards in the card holder to obtain a removal of the cards by the transport means from the card holder; means operatively coupled to the cards in the card holder for directing a controlled stream of fluid toward the trailing wall of the card holder and against the faces of the cards disposed in the direction of the transport means to lift the leading ends of the cards from the restricted opening for a prevention of any passage of cards from the card holder and for interrupting the controlled stream of fluid at particular times to provide for a removal of cards by the transport means from the card holder; means coupled to the cards in the card holder for imposing a holding force on the cards at the trailing ends of the cards to retain the cards in card holder and for interrupting this force upon interruptions in the controlled stream of fluid directed toward the trailing wall of the card holder to obtain the removal of cards by the transport means from the card holder; and means coupled to the fluid-directing means for obtaining a passage of fluid through such means.

19. Apparatus as set forth in claim 18, in which the holding means includes a pawl disposed in coupled relationship to the transport means for lifting the trailing ends of the cards from the transport means and includes vacuum means for exerting a vacuum force on the cards to press the cards against the pawl in opposition to any force exerted against the cards by the transport means.

20. In a system for processing data on a plurality of information storage cards as represented by signal indications on the cards, the combination of: a card holder including a leading wall and a trailing wall disposed in spaced relationship for retaining the cards in stacked relationship; transport means disposed in coupled relationship to the cards in the card holder for operating upon the cards in the card holder to obtain a removal of cards from the card holder and disposed relatively close to the trailing wall of the card holder to define a restricted opening with the trailing wall; means operatively coupled to the cards in the card holder for directing a stream of air under pressure against the leading ends of the cards in the card holder to move the leading ends of the cards toward the restricted opening for a transfer of the cards from the card holder to the transport means; and means coupled to the last mentioned means for obtaining a passage of air under pressure through such means.

21. In a system for processing data on a plurality of information storage cards as represented by signal indications on the cards, the combination of: a transporting component rotatably mounted and exhibiting a vacuum pressure at its peripheral surface for transporting the information storage cards on such surface; a card holder for maintaining the information storage cards in a stacked relationship, said card holder having a first wall at a leading position in the direction of movement of the cards and having a second wall at a trailing position in the direction of movement of the cards and being positioned to have a mouth adjacent the peripheral surface of said transporting component; and means coupled to the cards on the transporting component for directing fluid under pressure in a direction transverse to the face of the cards to overcome the vacuum pressure of said transporting component at the peripheral surface thereof in the vicinity of said second wall for a movement of the leading edge of any card transported by said component into such vicinity outwardly from said surface to engage said second wall.

22. In a system for processing data on a plurality of information storage cards as represented by signal indications on the cards, the combination of: a rotatably mounted transporting component for the cards for transporting the cards on the peripheral surface thereof; a card holder for maintaining the cards in a stacked relationship, said card holder having a first wall and a second wall extending outwardly from said peripheral surface of said transporting component, means coupled to the cards on the transporting component for arresting the cards transported on said peripheral surface of said transporting component with the leading edge of any such arrested card in contiguous relationship with said second wall; and stationary means mounted externally of said transporting component for emitting pressurized fluid in the vicinity of said first wall and in a tangential direction with respect to said periphtral surface of said transporting component to cause the trailing edge of such arrested card to be displaced outwardly from said peripheral surface of said transporting component.

23. In a system for processing data on a plurality of information storage cards as represented by signal indications on the cards, the combination of: transport means for providing a movement of cards, a card holder disposed in contiguous relationship to the transport means and including a pair of spaced walls for retaining the cards in stacked relationship; means disposed in coupled relationship to the cards on the transport means for providing a transfer of cards from the transport means to the card holder; first pneumatic means disposed in coupled relationship to the cards on the transport means between the spaced walls of the card holder for operating upon the cards transported by the transport means to obtain a transfer of cards to the card holder; and second pneumatic means disposed in coupled relationship to the cards on the transport means between the spaced walls of the card holder for operating upon the cards transported by the transport means to facilitate the stacking of the cards in the card holder in a sequential order related to the movement of the cards by the transport means.

24. In a system for processing data on a plurality of information storage cards as represented by signal indications to the cards, the combination of: transport means for providing a movement of the cards, a card holder disposed in contiguous relationship to the transport means for holding cards in stacked relationship and including leading and trailing walls disposed in spaced relationship for retaining the cards in stacked relationship; means disposed toward the trailing wall of the card holder for directing a stream of fluid under pressure against the leading portions of the cards being transported by the transport means to obtain a controlled transfer of cards from the transport means to the card holder; and means disposed in coupled relationship with the transport means at a position toward the trailing portion of the transport means for directing a stream of fluid under pressure against the trailing portion of each card to obtain an operation upon each card by the leading portion of the next card being transferred into the card holder to facilitate the transfer of cards into the card holder in a sequential order related to the transport of cards by the transport means.

25. In a system for processing data on a plurality of information storage cards as represented by signal indications on the cards, the combination of: means including a card holder having leading and trailing walls for retaining the cards in stacked relationship; transport means for providing a movement of the cards and disposed in coupled relationship to the cards in the card holder for obtaining a transfer of the cards from the card holder to the transport means and forming a restricted opening with the leading wall of the card holder to obtain a controlled transfer of cards from the card holder to the transport means; means coupled to the cards in the card holder for operating upon the trailing portions of the cards in the card holder to position the cards for facilitating the transfer of cards to the transport means; and pneumatic means coupled to the cards in the card holder for producing a force on the leading ends of the cards in the card holder to direct the leading ends toward the restricted opening for facilitating the transfer of cards from the card holder to the transport means.

26. In a system for processing data on a plurality of information storage cards as represented by signal indications on the cards, the combination of: transport means for providing a movement of cards; a card holder for retaining the cards and including leading and trailing walls disposed in spaced relationship to maintain the cards in stacked relationship and having the trailing wall extend to a position near the transport means to define a restricted opening with the transport means; means coupled to the cards in the card holder for directing a controlled stream of fluid toward the trailing wall of the card holder and against the faces of the cards disposed in the direction of the transport means to lift the leading ends of the cards from the restricted opening for a prevention of any passage of cards from the transport means and for interrupting the controlled stream of fluid at particular times to provide for a removal of cards by the transport means from the card holder; and means coupled to the cards in the card holder for imposing a holding force on the cards at the trailing ends of the cards to retain the cards in the card holder and for interrupting this force upon interruptions in the controlled stream of fluid directed toward the trailing wall of the card holder to obtain the removal of cards by the transport means from the card holder.

27. In a system for processing data on a plurality of information storage cards as represented by signal indications on the cards, the combination of: transport means for the cards; a card holder disposed in contiguous relationship to the transport means and including a pair of spaced walls for retaining cards in a stacked relationship; means disposed in coupled relationship to the cards on the transport means for providing a controlled transfer of cards from the transport means to the card holder; and pneumatic means disposed in coupled relationship to the cards on the transport means between the spaced walls of the card holder for imposing a pneumatic force on the cards to facilitate the controlled transfer of cards from the transport means to the card holder in a sequential order related to the movement of the cards by the transport means.

References Cited in the file of this patent

UNITED STATES PATENTS

| | | |
|---|---|---|
| 648,423 | North | May 1, 1900 |
| 1,040,025 | Schlesinger | Oct. 1, 1912 |
| 1,107,254 | Blackford | Aug. 18, 1914 |
| 2,497,149 | Berdis et al. | Feb. 14, 1950 |
| 2,522,226 | Hood | Sept. 12, 1950 |
| 2,525,741 | Von Hofe et al | Oct. 10, 1950 |
| 2,752,154 | Nelson | June 26, 1956 |
| 2,764,408 | Weiler | Sept. 25, 1956 |
| 2,817,519 | Beck | Dec. 24, 1957 |
| 2,842,362 | Hayes et al. | July 8, 1958 |
| 2,905,465 | Armstrong et al. | Sept. 22, 1959 |

FOREIGN PATENTS

| | | |
|---|---|---|
| 711,225 | Great Britain | June 30, 1954 |